United States Patent
Yanoff et al.

(10) Patent No.: US 12,493,128 B2
(45) Date of Patent: Dec. 9, 2025

(54) MEDICAL IMAGING DETECTOR

(71) Applicant: GE Precision Healthcare LLC, Wauwatosa, WI (US)

(72) Inventors: Brian D. Yanoff, Niskayuna, NY (US); Biju Jacob, Niskayuna, NY (US)

(73) Assignee: GE PRECISION HEALTHCARE LLC, Wauwatosa, WI (US)

(*) Notice: Subject to any disclaimer, the term of this patent is extended or adjusted under 35 U.S.C. 154(b) by 226 days.

(21) Appl. No.: 18/447,024

(22) Filed: Aug. 9, 2023

(65) Prior Publication Data

US 2025/0052916 A1    Feb. 13, 2025

(51) Int. Cl.
G01T 1/24 (2006.01)
A61B 6/42 (2024.01)

(52) U.S. Cl.
CPC ............ G01T 1/242 (2013.01); A61B 6/4208 (2013.01)

(58) Field of Classification Search
CPC .............................. G01T 1/242; A61B 6/4208
See application file for complete search history.

(56) References Cited

U.S. PATENT DOCUMENTS

| | | | |
|---|---|---|---|
| 6,043,495 A * | 3/2000 | Verger | H10F 30/29 |
| | | | 257/E31.086 |
| 8,552,466 B2 | 10/2013 | Ikhlef et al. | |
| 11,041,968 B2 | 6/2021 | Danielsson et al. | |
| 11,733,407 B2 * | 8/2023 | Cao | G01T 1/243 |
| | | | 250/370.01 |
| 2004/0149919 A1 * | 8/2004 | Lechner | H10F 77/206 |
| | | | 257/E31.089 |
| 2018/0337204 A1 | 11/2018 | Bakowski Holtryd | |
| 2021/0333420 A1 * | 10/2021 | Iniewski | H10F 39/189 |

FOREIGN PATENT DOCUMENTS

| | | |
|---|---|---|
| CN | 114759055 A | 7/2022 |
| CN | 115548138 A | 12/2022 |
| EP | 4040492 A1 | 8/2022 |

OTHER PUBLICATIONS

EP application 24190714.6 filed Jul. 24, 2024—extended Search Report issued Dec. 13, 2024; 8 pages.
Barberis, E. et al., "Capacitances in silicon microstrip detectors," Nuclear Instruments and Methods in Physics Research Section A: Accelerators, Spectrometers, Detectors and Associated Equipment, vol. 342, No. 1, Mar. 15, 1994, 6 pages.

(Continued)

*Primary Examiner* — Hugh Maupin
(74) *Attorney, Agent, or Firm* — McCoy Russell LLP

(57) ABSTRACT

Systems and methods are provided for a detector for medical imaging. The detector for medical imaging includes a mesh detector element formed on a planar side of a first semiconductor layer. The mesh detector element includes a metal layer including a plurality of longitudinal strips, where each longitudinal strip is positioned over a respective second semiconductor layer of the opposite doping polarity from the first semiconductor layer, and embedded in the first semiconductor layer. Further, each longitudinal strip is separated from a neighboring longitudinal strip by a respective opening of a plurality of openings, such that the metal layer does not extend continuously across a width of the mesh detector element.

18 Claims, 10 Drawing Sheets

(56) References Cited

OTHER PUBLICATIONS

Shrestha, S. et al., "A Silicon-on-Insulator-Based Dual-Gain Charge-Sensitive Pixel Detector for Low-Noise X-ray Imaging for Future Astronomical Satellite Missions," Sensors, vol. 18, No. 6, Jun. 1, 2018, 19 pages.

Li, X. et al., "Design and simulation of silicon detector cells with spiral ring electrode structures," AIP Advances, vol. 11, No. 4, Apr. 27, 2021, 11 pages.

\* cited by examiner

MEDICAL IMAGING DETECTOR

TECHNICAL FIELD

Embodiments of the subject matter disclosed herein relate to medical imaging, and more particularly, to detectors for medical imaging.

BACKGROUND

In computed tomography (CT) imaging systems, an electron beam is generated by a cathode and is directed towards a target within an x-ray tube. A fan-shaped or cone-shaped beam of x-rays produced by electrons colliding with the target is directed towards a subject, such as a patient. After being attenuated by the subject, the x-rays impinge upon an array of radiation detectors, generating an image.

A quality of a CT image may be increased by using Photon Counting CT (PCCT), where the radiation detectors are photon-counting detectors, and photons are counted to provide spectral information. PCCT uses a direct-conversion detector and has various advantages over conventional indirect-conversion-detector-based Energy Integrating Detector (EID) CT systems. However, one performance limiting factor of PCCT detectors, is electronic noise that is present during imaging. Electronic noise determines the noise floor for PCCT detectors, which is the minimum energy x-ray that can be registered by the readout electronics.

SUMMARY

The current disclosure at least partially addresses one or more of the above identified issues with a detector for medical imaging. The detector for medical imaging includes a mesh detector element formed on a planar side of a first semiconductor layer. The mesh detector element includes a metal layer including a plurality of longitudinal strips, where each longitudinal strip is positioned over a respective second semiconductor layer of the opposite doping polarity from the first semiconductor layer, and embedded in the first semiconductor layer. Further, each longitudinal strip is separated from a neighboring longitudinal strip by a respective opening of a plurality of openings, such that the metal layer does not extend continuously across a width of the mesh detector element.

By using a mesh detector element that includes openings, the capacitance of the detector element is reduced, which is the largest factor affecting electronic noise in PCCT. Further, by utilizing openings in the detector element, a contrast-to-noise ratio for soft tissue contrast imaging is increased by 10-15% and a contrast-to-noise ratio for material decomposition imaging is maintained or slightly increased.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

Figure 1:
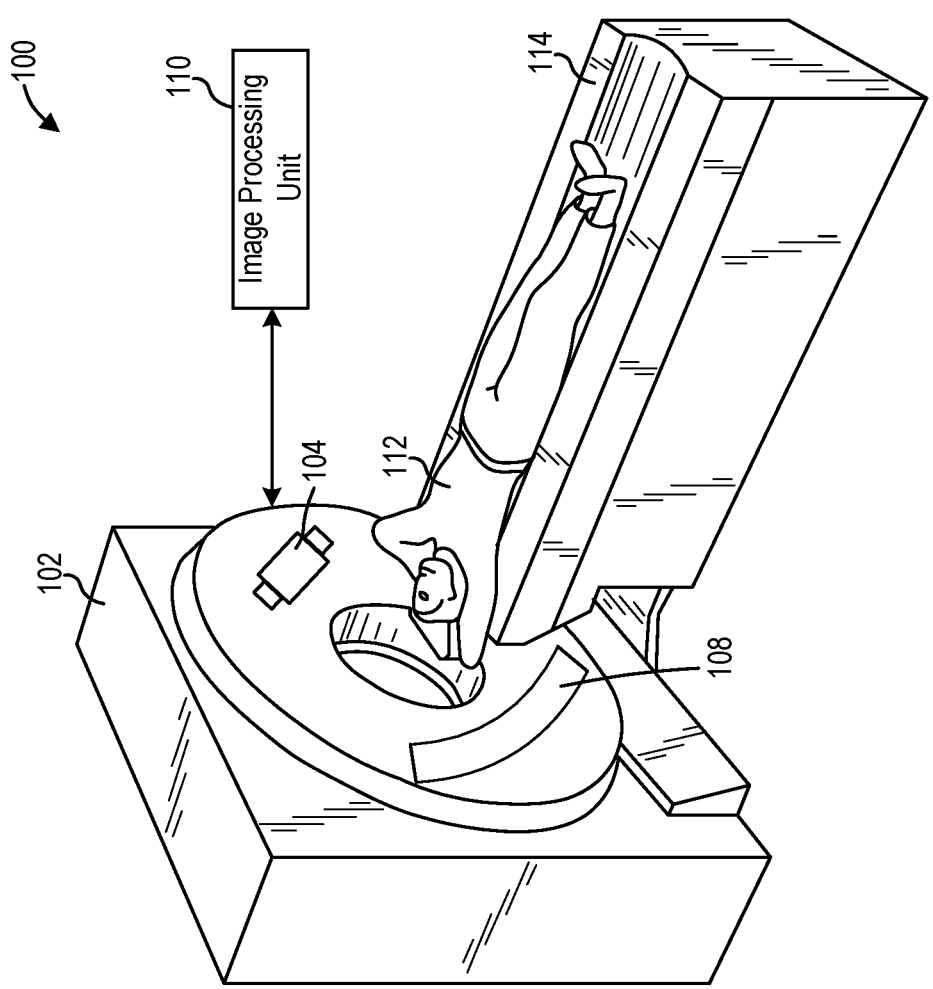
FIG. 1 shows a pictorial view of an imaging system, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

This description and embodiments of the subject matter disclosed herein relate to methods and systems for reducing the capacitance of a photon-counting computed tomography (PCCT) system. Typically, in computed tomography (CT) imaging systems, an x-ray source emits a fan-shaped beam or a cone-shaped beam towards a subject, such as a patient. Generally, in CT systems the x-ray source and the detector array are rotated about a gantry within an imaging plane and around the patient, and images are generated from projection data at a plurality of views at different view angles. For example, for one rotation of the x-ray source, one thousand views may be generated by the CT system. The beam, after being attenuated by the patient, impinges upon an array of radiation detectors. Each x-ray detector or detector array typically includes a collimator for collimating x-ray beams received at the detector, a scintillator disposed adjacent to the collimator for converting x-rays to light energy, and photodiodes for receiving the light energy from the adjacent scintillator and producing electrical signals therefrom. An intensity of the attenuated beam radiation received at the detector array is typically dependent upon the attenuation of the x-ray beam by the patient. Each detector element of a detector array produces a separate electrical signal indicative of the attenuated beam received by each detector element. The electrical signals are transmitted to a data processing system for analysis. The data processing system processes the electrical signals to facilitate generation of an image.

Such conventional CT imaging systems utilize detectors that convert radiographic energy into current signals that are integrated over a time period, then measured and ultimately digitized. However, a drawback of such detectors is their inability to provide data on the number and/or energy of photons detected. That is, the light emitted by the scintillator is a function of both a number of x-rays impinged and an energy level of the x-rays. The photodiodes may not be capable of discriminating between the energy level or the photon count from the scintillation. For example, two scintillators may illuminate with equivalent intensity and, as such, provide equivalent output to their respective photodiodes. Yet, despite yielding an equivalent light output, the number of x-rays received by each scintillator may be different, and an intensity of the x-rays may be different.

In contrast, PCCT detectors may provide photon counting and/or energy discriminating feedback with high spatial resolution. PCCT detectors can be caused to operate in an x-ray counting mode, an energy measurement mode of each x-ray event, or both. While a number of materials may be used in the construction of a hybrid photon counting energy discriminating detector, semiconductors have been shown to be one preferred material. Typical materials for such use include Cadmium Zinc Telluride (CZT), Cadmium Telluride (CdTe) and Silicon (Si). Other heavy semiconductors, such as thallium bromide (TlBr), mercury iodide (HgI), etc., may also be used.

PCCT detectors support both x-ray photon counting and energy measurement or tagging, supporting the acquisition of both anatomical detail as well as tissue characterization information. In this regard, energy discriminating information or data may be used to reduce the effects of beam hardening and the like. Furthermore, PCCT detectors support the acquisition of tissue discrimination data and therefore provide diagnostic information that is indicative of disease or other pathologies. PCCT detectors can also be used to detect, measure, and characterize materials that may be injected into a subject, such as contrast agents and/or other specialized materials, by the use of optimal energy weighting to boost the contrast of iodine and calcium (and other high atomic-number materials). Contrast agents can, for example, include iodine that is injected into the blood stream for visualization.

One performance limiting factor of PCCT detectors, especially for edge illuminated silicon based detectors, however, is electronic noise that is present during imaging. Electronic noise determines the noise floor for PCCT detectors, which is the minimum energy x-ray that can be registered by the readout electronics. The capacitance of detectors within the PCCT detector is the largest factor that effects the electronic noise, and therefore reducing the capacitance of the detectors will decrease the noise floor of the detector. In some examples, detector capacitance may be reduced by creating openings in the internal area of the detector, while remaining strip-like structures may continue to produce substantially identical signals from x-rays absorbed in silicon of the detector. Such detectors may effectively increase the efficiency of silicon PCCT diodes by reducing the electronic noise in readout electronics of the detector and reducing the lowest possible photon counting threshold.

Figure 2:
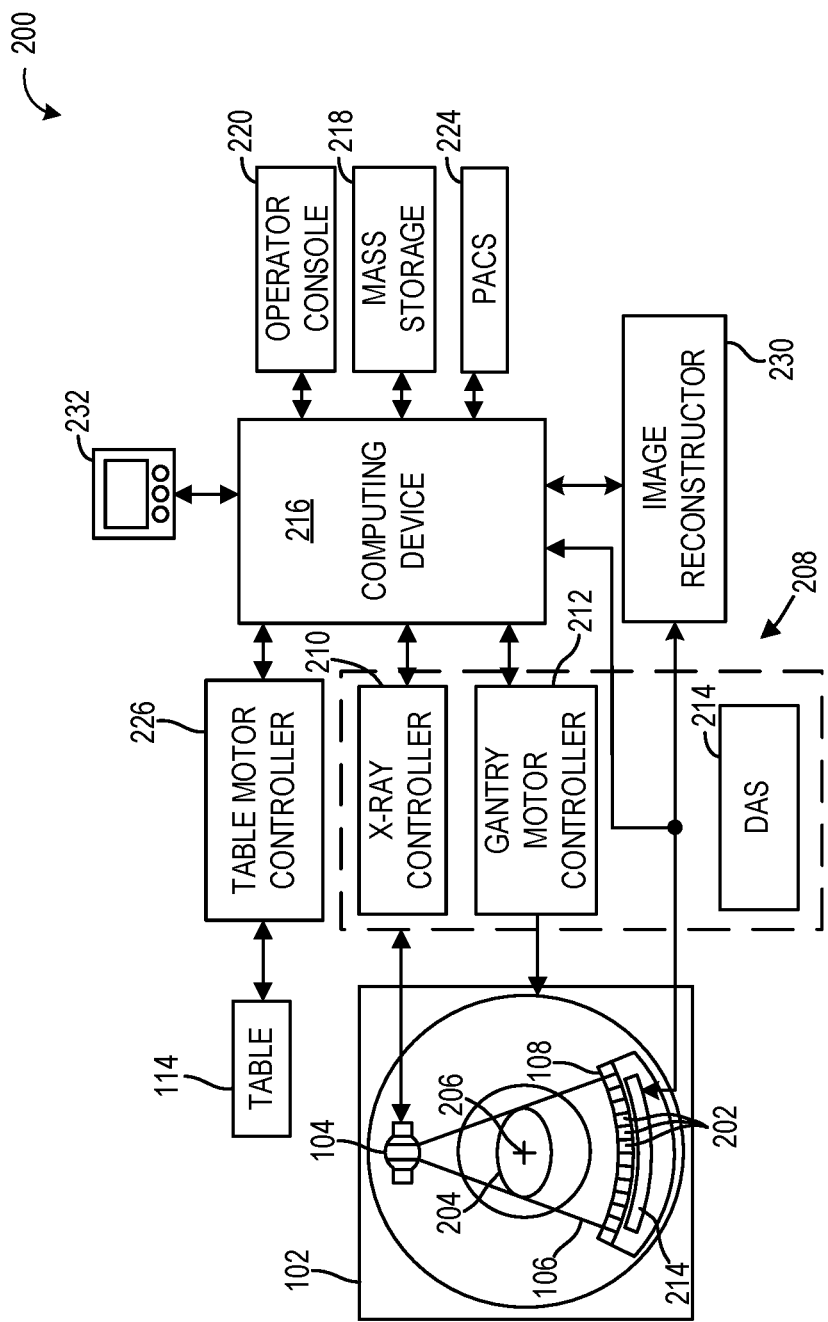
FIG. 2 shows a block schematic diagram of an exemplary imaging system, in accordance with one or more embodiments of the present disclosure.
Figure 3:
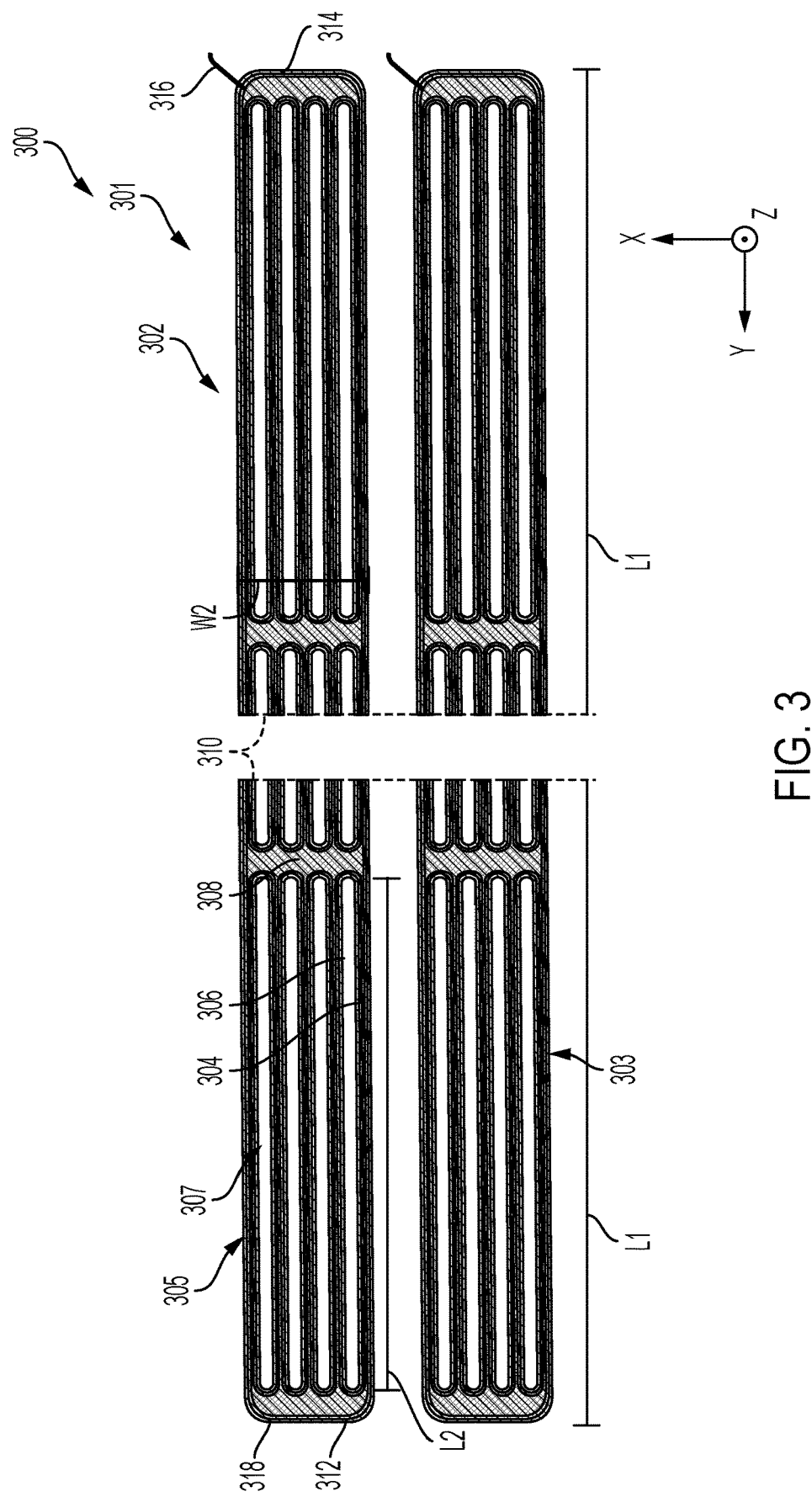
FIG. 3 shows mesh detector elements including longitudinal strips and openings, in accordance with one or more embodiments of the present disclosure.
Figure 4:
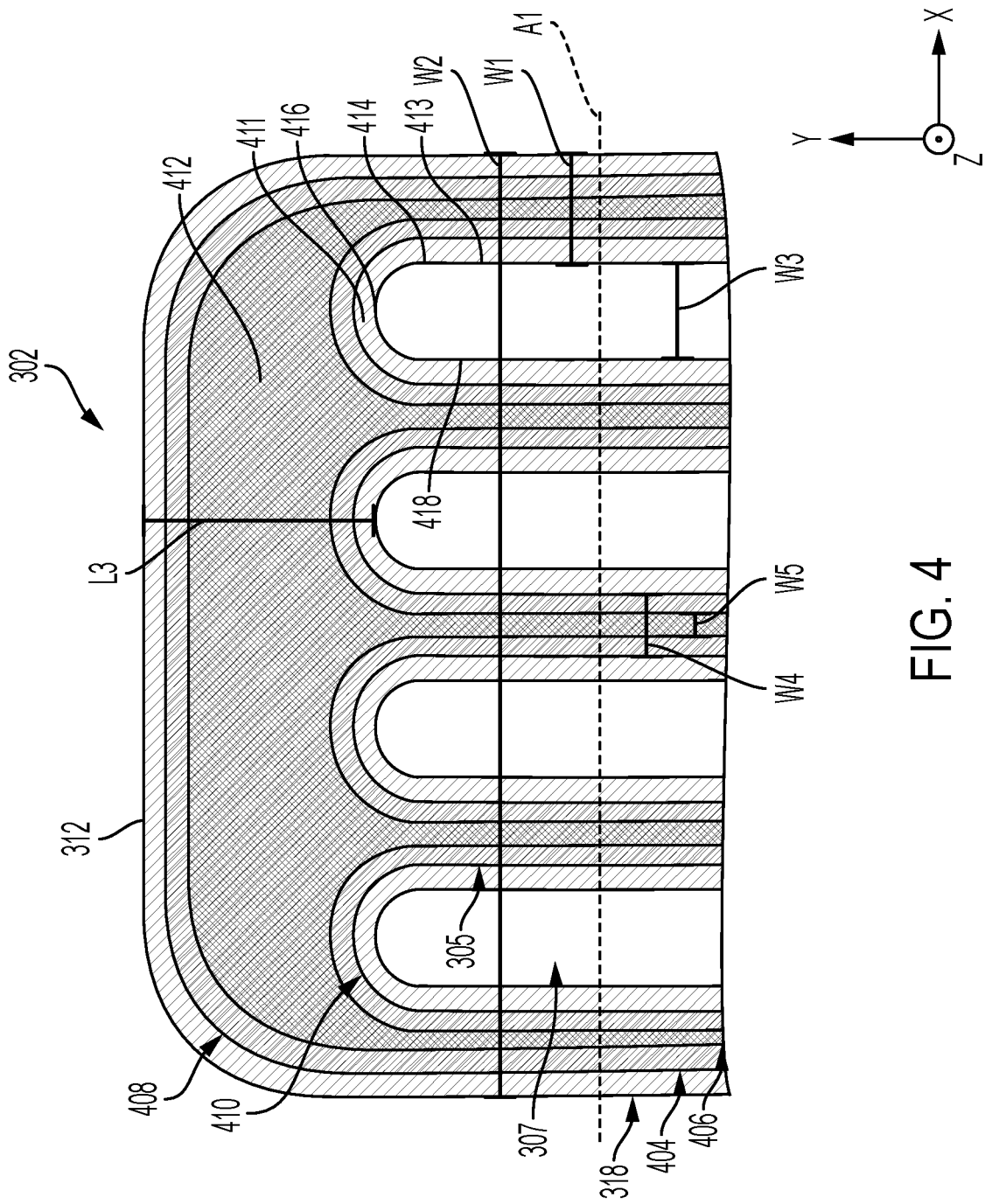
FIG. 4 shows a portion of a mesh detector element of FIG. 3, in accordance with one or more embodiments of the present disclosure.
Figure 5:
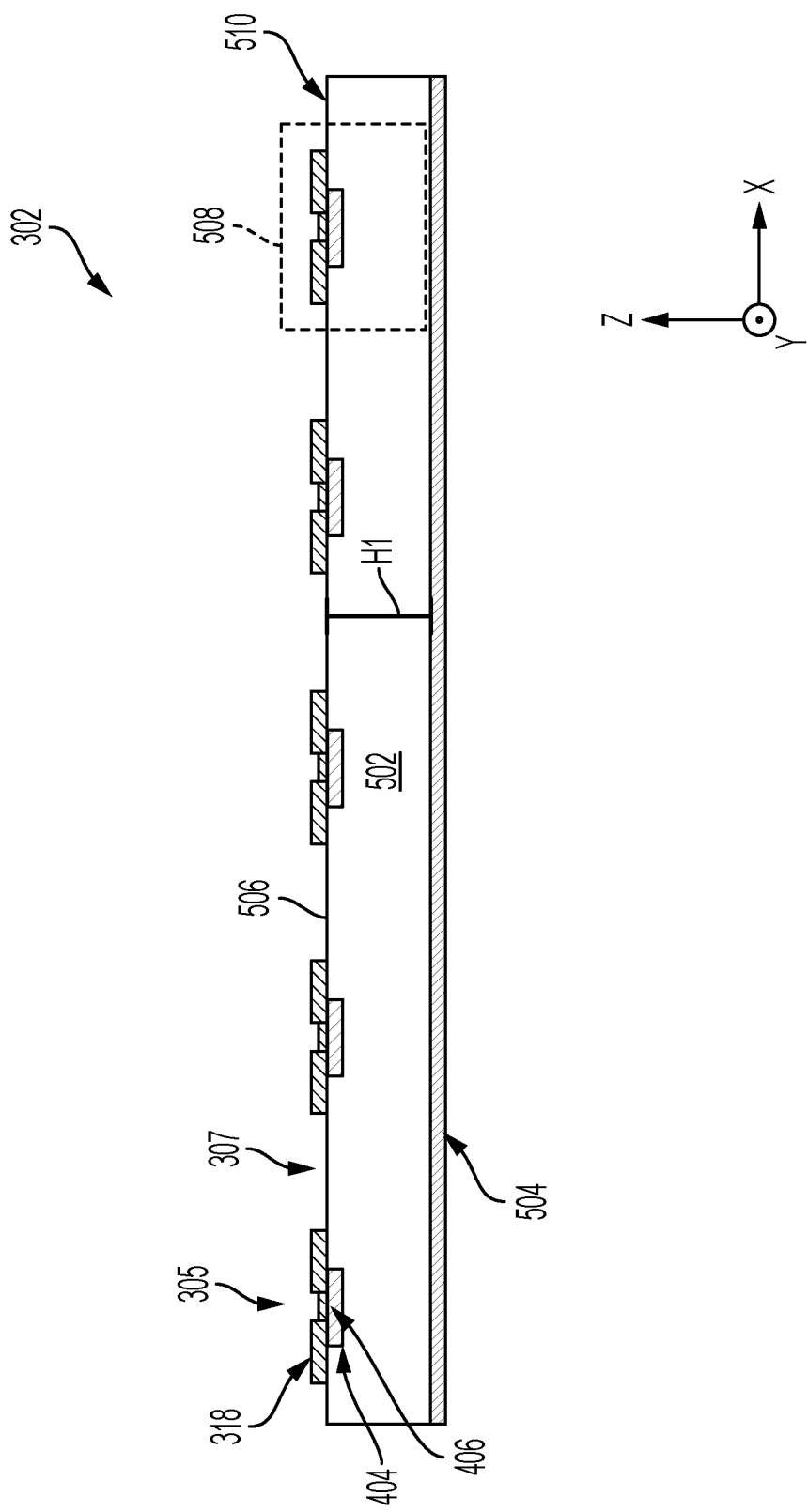
FIG. 5 shows a cross sectional view of a mesh detector element of FIG. 3 positioned on a semiconductor layer, in accordance with one or more embodiments of the present disclosure.
Figure 6:
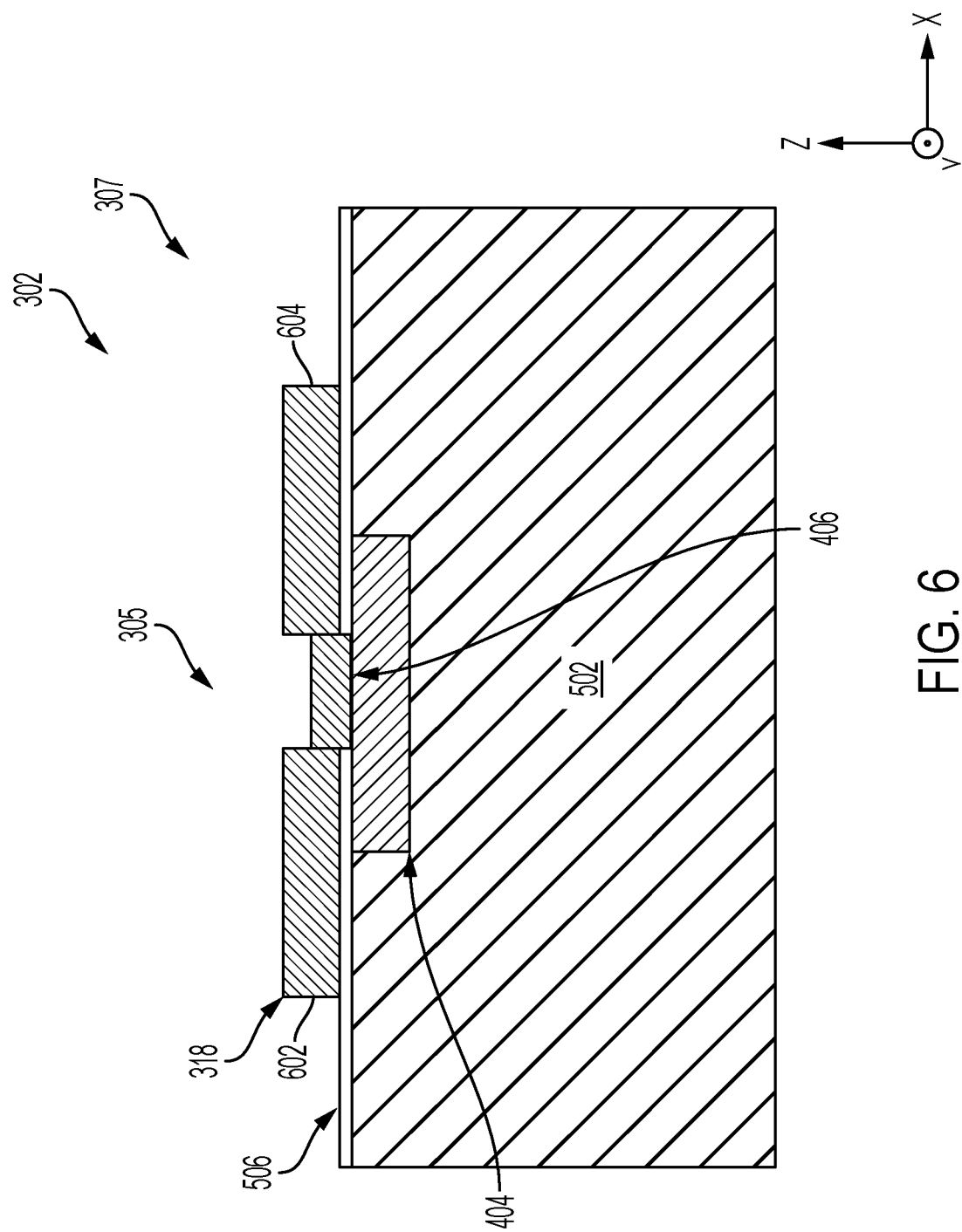
FIG. 6 shows a zoomed in view of the cross-sectional view of FIG. 5, in accordance with one or more embodiments of the present disclosure.
Figure 7:
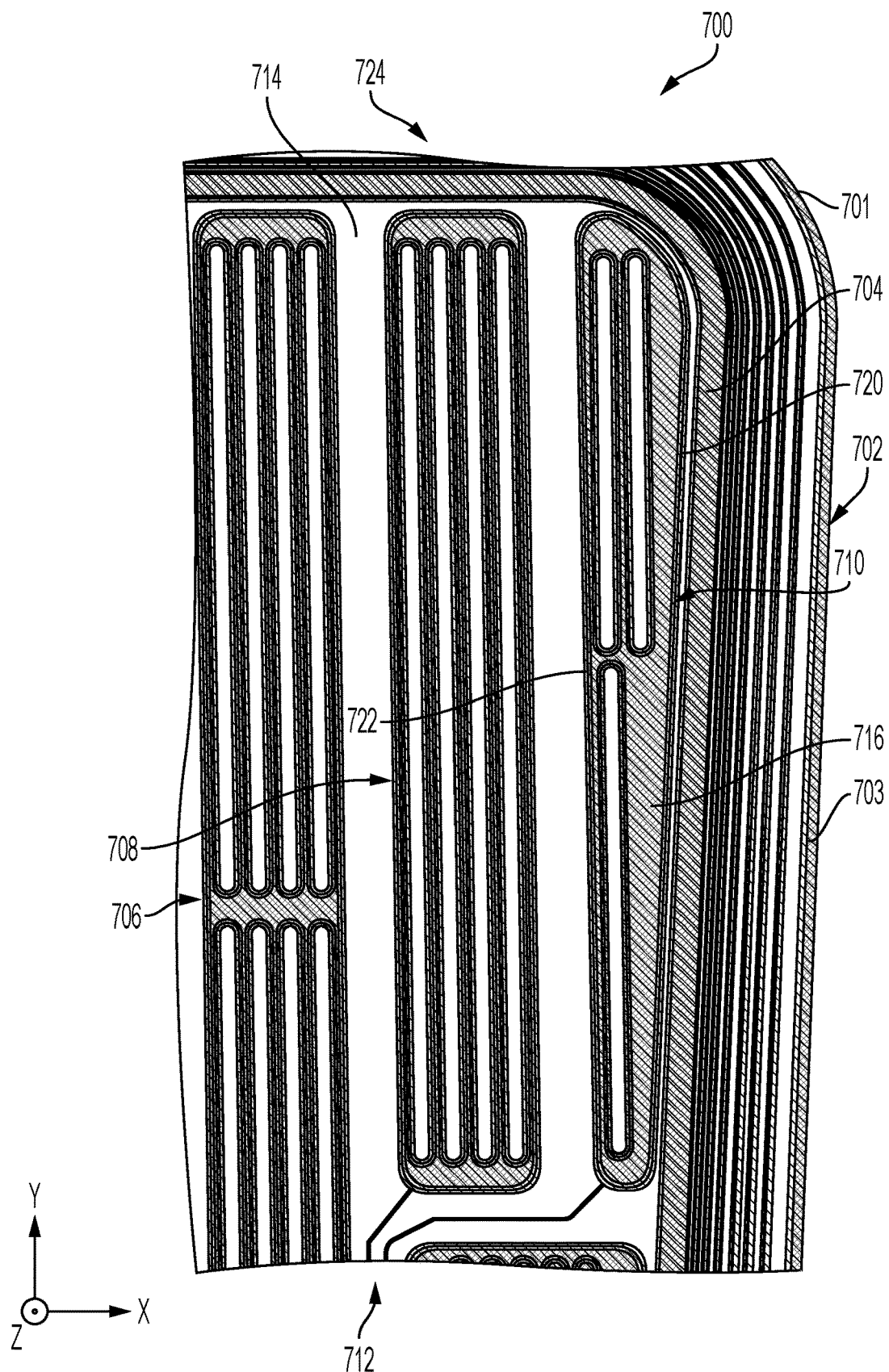
FIG. 7 shows a portion of a first example detector array including mesh detector elements, in accordance with one or more embodiments of the present disclosure.
Figure 8:
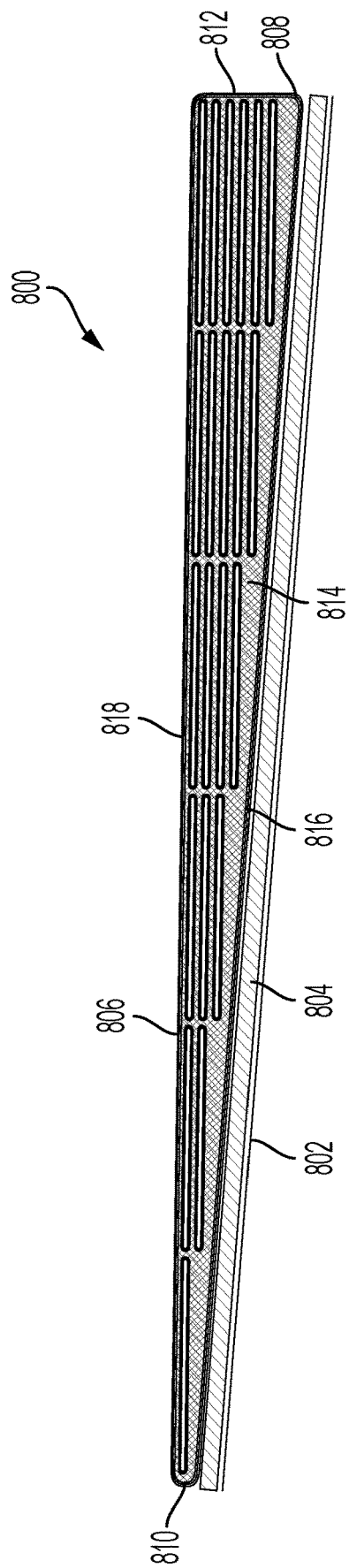
FIG. 8 shows a portion of a second example detector array including mesh detector elements, in accordance with one or more embodiments of the present disclosure.
Figure 9:
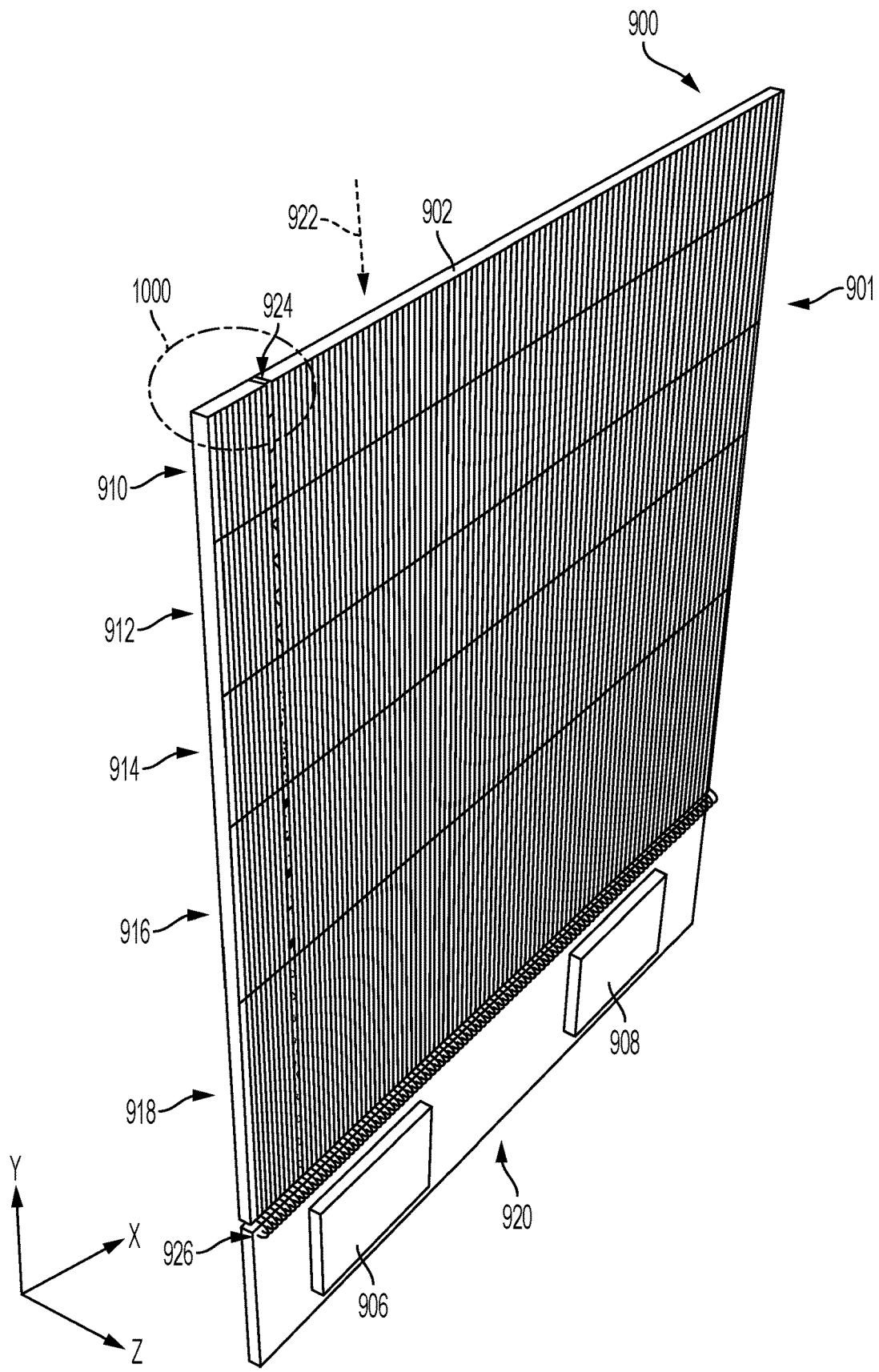
FIG. 9 shows a third example detector array, in accordance with one or more embodiments of the present disclosure.
Figure 10:
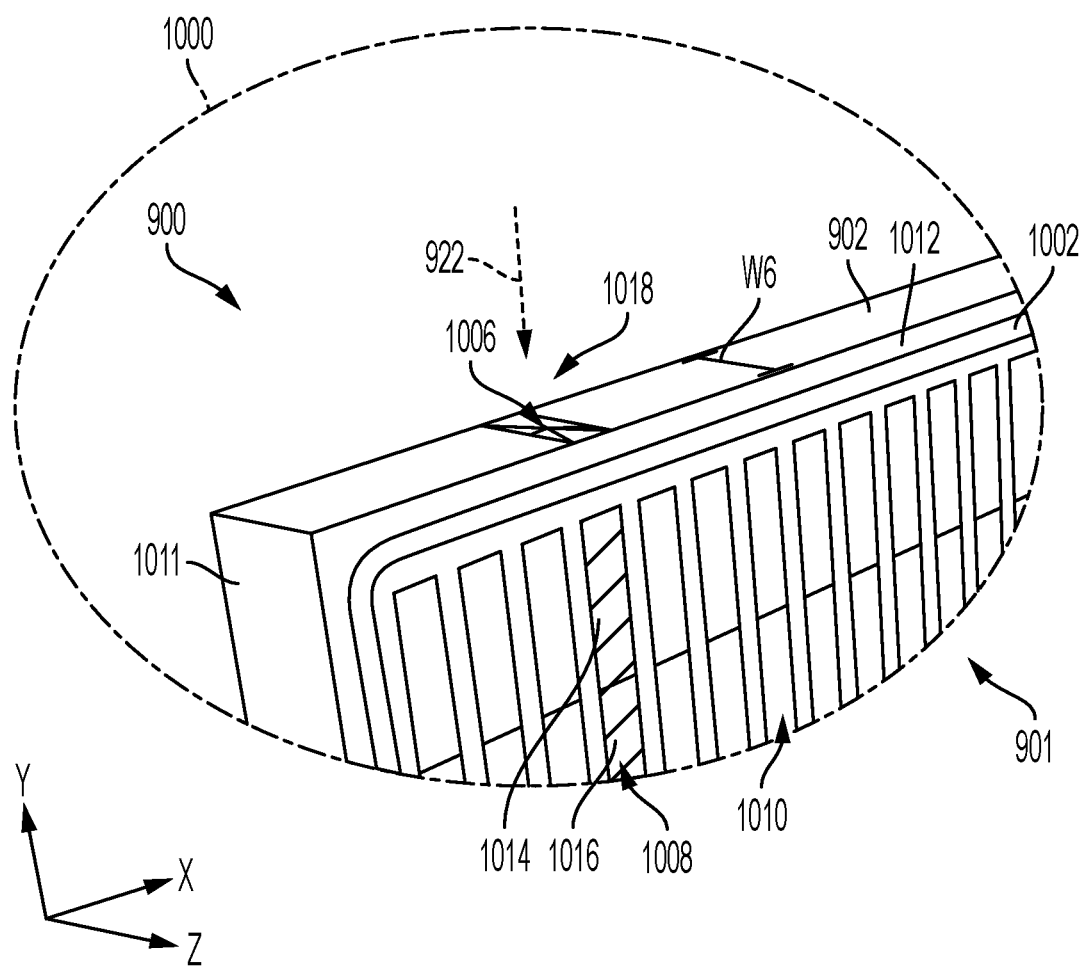
FIG. 10 shows a portion of the detector array of FIG. 9, in accordance with one or more embodiments of the present disclosure.

An example of a PCCT system that may be used to perform contrast scans in accordance with the present techniques is provided in FIGS. 1 and 2. FIG. 3 shows example mesh detector elements of the PCCT system, where each mesh detector element is utilized in counting photons of x-rays directed at a subject by an x-ray source. Each mesh detector element may include a metal layer positioned over a p-type semiconductor layer and organized into longitudinal strips. The longitudinal strips of each mesh detector element allow for charge carriers to be collected and transferred from the detector array to signal readout traces for image analysis. Each mesh detector element includes openings positioned between the longitudinal strips for reducing a capacitance of the mesh detector element. The longitudinal strips and the openings are more closely illustrated in FIG. 4. FIGS. 5 and 6 show cross sectional views of a mesh detector element positioned over the p-type semiconductor layer, an n-type semiconductor layer, and an oxide layer of the detector array. The n-type semiconductor layer collects photons of x-ray radiation and transforms them into charge carriers. The charge carriers are then transferred into the longitudinal strips of each mesh detector element before being transmitted as an electrical signal to an image processing unit. FIGS. 7 and 8 illustrate portions of example detector arrays, including arrangements of mesh detector elements positioned on a planar surface of a semiconductor layer. Further, FIGS. 9 and 10 show an example detector array including a plurality of detectors. The plurality of detectors may be arranged in columns such that incident x-ray radiation may pass through an edge of the detector array and continue vertically through the columns. Each beam of incident x-ray radiation is transformed into charge carriers, and one or more of the charge carriers are collected and transferred by the plurality of detectors.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below/underneath one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 illustrates an exemplary PCCT system 100 configured for CT imaging with photon-counting detectors. Particularly, the PCCT system 100 is configured to image a subject 112 such as a patient, an inanimate object, one or more manufactured parts, and/or foreign objects such as dental implants, stents, and/or contrast agents present within the body. In some examples, the PCCT system 100 includes a gantry 102, which in turn, may further include an x-ray source 104 configured to project a beam of x-ray radiation 106 (see FIG. 2) for use in imaging the subject 112 laying on a table 114. Specifically, the x-ray source 104 is configured to project the x-ray radiation beams 106 towards a detector array 108 positioned on the opposite side of the gantry 102. Although FIG. 1 depicts a single x-ray source 104, in some examples, multiple x-ray sources and detectors may be employed to project a plurality of x-ray radiation beams for acquiring projection data at different energy levels corresponding to the patient. In some examples, the x-ray source 104 may enable dual-energy gemstone spectral imaging (GSI) by rapid peak kilovoltage (kVp) switching. In the examples described herein, the x-ray detector employed is a photon-counting detector which is capable of differentiating x-ray photons of different energies.

In some examples, the PCCT system 100 further includes an image processing unit 110 configured to reconstruct images of a target volume of the subject 112 using an iterative or analytic image reconstruction method. For example, the image processing unit 110 may use an analytic image reconstruction approach such as filtered back projection (FBP) to reconstruct images of a target volume of the patient. As another example, the image processing unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processing unit 110 may use an analytic image reconstruction approach such as FBP in addition to an iterative image reconstruction approach.

In some CT imaging system configurations, an x-ray source projects a cone-shaped x-ray radiation beam which is collimated to lie within an X-Y-Z plane of a Cartesian coordinate system and generally referred to as an "imaging plane." The x-ray radiation beam passes through an object being imaged, such as the patient or subject. The x-ray radiation beam, after being attenuated by the object, impinges upon an array of detector elements. The intensity of the attenuated x-ray radiation beam received at the detector array is dependent upon the attenuation of an x-ray radiation beam by the object. Each detector element of the array produces a separate electrical signal that is a measurement of the x-ray beam attenuation at the detector location. The attenuation measurements from all the detector elements are acquired separately to produce a transmission profile.

In some CT systems, the x-ray source and the detector array are rotated with a gantry within the imaging plane and around the object to be imaged such that an angle at which the x-ray beam intersects the object constantly changes. A group of x-ray radiation attenuation measurements (e.g., projection data) from the detector array at one gantry angle is referred to as a "view." A "scan" of the object includes a set of views made at different gantry angles, or view angles, during one revolution of the x-ray source and detector.

FIG. 2 illustrates an exemplary imaging system 200 similar to the PCCT system 100 of FIG. 1. In accordance with aspects of the present disclosure, the imaging system 200 is configured for imaging a subject 204 (e.g., the subject 112 of FIG. 1). In some examples, the imaging system 200 includes the detector array 108 of FIG. 1. The detector array 108 further includes a plurality of detector elements 202 that together sense the x-ray radiation beam 106 that pass through the subject 204 (e.g., a patient) to acquire corresponding projection data. In some examples, the detector array 108 may be fabricated in a multi-slice configuration including the plurality of rows of cells or detector elements 202, where one or more additional rows of the detector elements 202 are arranged in a parallel configuration for acquiring the projection data.

In some examples, the imaging system 200 may be configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in examples where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. Data collected by the detector array 108 undergoes pre-processing and calibration to condition the data to represent the line integrals of the attenuation coefficients of the subject 204 that was scanned. The processed data are commonly called projections. In some examples, the individual detectors or detector elements 202 of the detector array 108 may include photon-counting detectors which register the interactions of individual photons into one or more energy bins.

The acquired sets of projection data may be used for basis material decomposition (BMD). During BMD, the measured projections are converted to a set of material-density projections. The material-density projections may be reconstructed to form a pair or a set of material-density maps or images of each respective basis material, such as bone, soft tissue, and/or contrast agent maps. The density maps or images may be, in turn, associated to form a 3D volumetric image of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show internal features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In some examples, the imaging system 200 includes a control mechanism 208 to control movement of the components such as rotation of the gantry 102 and the operation of the x-ray source 104. In some examples, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In some examples, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. It is noted that the computing device 216 may be the same or similar to image processing unit 110, in at least one example. In some examples, the computing device 216 stores the data in a storage device 218 (e.g., a mass storage). The storage device 218, for example, may be any type of non-transitory memory and may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In some examples, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates one operator console 220, more than one operator console may be coupled to the imaging system 200, for example, for inputting or outputting system parameters, requesting examinations, plotting data, and/or viewing images. Further, in some examples, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In some examples, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 that may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in some examples, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary example may use computing resources in a "cloud" network cluster for the image reconstructor 230.

In some examples, the image reconstructor 230 stores the images reconstructed in the storage device 218. Alternatively, the image reconstructor 230 may transmit the reconstructed images to the computing device 216 for generating useful patient information for diagnosis and evaluation. In some examples, the computing device 216 may transmit the reconstructed images and/or the patient information to a display or display device 232 communicatively coupled to the computing device 216 and/or the image reconstructor 230. In some examples, the reconstructed images may be transmitted from the computing device 216 or the image reconstructor 230 to the storage device 218 for short-term or long-term storage.

FIGS. 3-10 include a coordinate system to orient the views. The z-axis may be a vertical axis (e.g., parallel to the rotational axis of the CT gantry), the y-axis may be a longitudinal axis (e.g., in the direction from the detector towards the source), and/or the x-axis may be a lateral axis (e.g., a circumferential direction), in one example. However, the axes may have other orientations, in other examples.

Referring now to FIG. 9, a detector array 900 is shown. The detector array 900 may be a non-limiting example of one sensor of the detector array 108 of FIG. 1. In some examples, the detector array 108 of FIG. 1 may include more than one hundred sensors (e.g., the detector array 900) arranged into chiclets and/or modules of the detector array 108. A plurality of detectors 901 may be arranged in a parallel configuration to form the detector array 900, which may be used for acquiring projection data, as described above. Further, FIG. 10 shows a magnified view of an area 1000 of the detector array 900, including a portion of the plurality of detectors 901. FIGS. 9 and 10 are described collectively herein.

The detector array 900 may include the plurality of detectors 901 and a printed circuit board (PCB) 920. In the example shown in FIG. 9, the plurality of detectors 901 and the PCB 920 are arranged vertically with respect to the y-axis. Further, an arrow 922 is oriented parallel to the y-axis and indicates a typical direction of incoming x-ray radiation in an exemplary embodiment. The PCB 920 may be positioned below the plurality of detectors 901, such that the PCB is not between the plurality of detectors 901 and incoming x-ray radiation. Further, positioning the PCB 920 below the plurality of detectors 901 (e.g., with respect to the y-axis) may allow multiple detector arrays, such as the detector array 900, to be space-efficiently packed into chiclets and/or modules of a detector (e.g., the detector array 108 of FIG. 2).

The detector array 900 may include a layer of semiconductor material, such as a semiconductor layer 1011. The plurality of detectors 901 may be positioned on a planar surface 1012 of the semiconductor layer 1011. Further, the semiconductor layer 1011 may have a width W6 in a range of 100-1000 μm, such as 500 μm or 650 μm. As illustrated in FIG. 10, the detector array 900 may include a guard ring 1002. The guard ring 1002 may comprise of one or more narrow structures that extend along each edge of the planar surface 1012 and surround the plurality of detectors 901. In an exemplary embodiment, each such narrow structure comprises a p-type semiconductor layer and a metal layer on the planar surface 1012 of the semiconductor layer. In a further embodiment, the guard ring comprises multiple concentric narrow structures acting collectively as a guard ring structure. The guard ring 1002 protects the detector array 900 from electrical (avalanche) breakdown of the semiconductor layer by limiting the maximum electric field.

The plurality of detectors 901 may be electronically coupled to one or more application-specific integrated circuits (ASICs), such as a first ASIC 906 and a second ASIC 908 mounted on the PCB 920. As described in greater detail below, the first ASIC 906 and the second ASIC 908 may each calculate photon counts detected by the plurality of detectors 901. The plurality of detectors 901 may be coupled to the first ASIC 906 and the second ASIC 908 via a plurality of wire bonds 926 that run between the plurality of detectors and the PCB 920. Additionally, the plurality of detectors 901 may alternatively be directly coupled to the ASICS 906 and 908 via a plurality of wire bonds. Additionally, the PCB 920 may be electrically connected to readout electronics, which may also be used to calculate the number of photons detected by the plurality of detectors 901. In some examples, readout electronics may be external to the PCB 920 (e.g., for use during assembly and testing). Further, readout electronics may form a part of a DAS of a PCCT system (e.g., the DAS 214 of FIG. 2).

The plurality of detectors 901 may be configured to detect photons of x-ray radiation penetrating an edge 902 of the semiconductor layer 1011 of the detector array 900. The edge 902 may have the width W6 (e.g., 500 μm or 600 μm), along the z-axis. Further, the edge 902 may be oriented orthogonally to the planar surface 1012. As such, the plurality of detectors 901 may be positioned on a surface of the detector array 900 that is perpendicular to incoming x-ray radiation.

The plurality of detectors 901 may be arranged in columns, with each column extending along the y-axis. For example, the plurality of detectors 901 may include a first column 1008 and a second column 1010. Each column may include one or more detectors, such as a first detector 1014 and a second detector 1016 of the first column 1008. A column of detectors (e.g., the first column 1008) and a portion of the semiconductor layer 1011 that is positioned behind the column of detectors (e.g., relative to the z-axis) may be defined as a pixel, and thus the detector array 900 may include a plurality of pixels. For example, a pixel 1018 may include the first column 1008 (e.g., the first detector 1014 and the second detector 1016) and a portion of the semiconductor layer 1011 that is positioned behind the first column relative to the z-axis.

Each pixel may include a pixel area on the edge 902 of the detector array 900. When a beam of incident x-ray radiation penetrates into a pixel area, photons of the beam of x-ray radiation may interact with the semiconductor layer 1011, releasing energy. The energy is transformed into charge carriers within the corresponding pixel. For example, the pixel 1018 may include a pixel area 1006 on the edge 902 of the detector array 900. When incident x-ray radiation penetrates the pixel area 1006, photons of the x-ray radiation are transformed into charge carriers within a portion of the semiconductor layer 1011 positioned below the pixel area (e.g., with respect to the y-axis), and the charge carriers are detected by detectors in the first column 1008. As such, each pixel (e.g., the pixel 1018) may receive incident x-ray radiation at a pixel area on the edge 902, convert the x-ray radiation into an electrical charge within the semiconductor layer 1011, and collect the electrical charge at detectors within the pixel. The electrical charge collected by the plurality of detectors 901 may then be sent to one or more ASICs of the detector array via signal readout traces.

As illustrated in FIG. 9, each column of detectors (e.g., the first column 1008 of FIG. 10) may extend from the top of the detector array 900 to the PCB 920 along the y-axis. The detectors in each column may further be organized into one or more rows of the detector array 900, such as a first row 910 and a second row 912.

Each row of the plurality of detectors 901 includes a single detector in each column. For example, a column 924 of the plurality of detectors 901 may include one detector in the first row 910 and one detector in the second row 912. Further, the column 924 may include one detector in each of a third row 914, a fourth row 916, and a fifth row 918. In some examples, a detector in one row may have a different length than a detector in a different row. For example, a detector in the first row 910 may be shorter in length, relative to the y-axis, than a detector in the second row 912. As such, the entire first row 910 may be shorter in length, relative to the y-axis, than the entire second row 912. In other examples, detectors in each row may have the same length. For example, a detector in the first row may have the same length, relative to the y-axis, as a detector in the second row. As such, the entire first row may have the same length, relative to the y-axis, as the entire second row.

Each detector (e.g., the first detector 1014 of FIG. 10) of the plurality of detectors 901 may be electrically coupled to the first ASIC 906 and/or the second ASIC 908 that are mounted on the PCB 920. In some examples, each detector of the plurality of detectors 901 may be electrically coupled to a sensor bond pad via a signal readout trace. Further, sensor bond pads may be electrically coupled to the first ASIC 906 and/or the second ASIC 908 via wire bonds, which may extend to the PCB 920. Each ASIC may be configured to receive electrical signals from one or more columns and/or rows of the detector array 900.

Further, each detector of the plurality of detectors 901 may collect charge carriers produced by the semiconductor layer 1011 of FIG. 10. The semiconductor layer 1011 may produce charge carriers after receiving a number of incoming photons via one or more beams of x-ray radiation. As x-ray radiation impacts the detector array 900 on the edge 902 (e.g., at the pixel area 1006), photons of the x-ray radiation may pass through the semiconductor layer 1011 of a pixel, where each pixel includes a portion of the semiconductor layer and a column of the plurality of detectors 901. For example, photons of x-ray radiation may impact the detector array 900 at the pixel area 1006 of FIG. 10, and may subsequently pass through the semiconductor layer 1011 corresponding to the first column 1008. As the x-ray radiation passes through the semiconductor layer 1011, a number of photons of the x-ray radiation may be converted into charge carriers that are collected by detectors of the corresponding column (e.g., the first column 1008).

For example, x-ray radiation may enter the semiconductor layer 1011 of a pixel, and a first number of photons may be converted into electrical charge in a portion of the semiconductor layer that is positioned behind the first row 910, relative to the z-axis. Detectors positioned within the first row 910 of the pixel may collect the electrical charge created from the first number of photons of the x-ray radiation. The first number of photons may be less than a total number of photons of the x-ray radiation, and a second number of the total number of photons may pass through the portion of the semiconductor layer 1011 that is positioned behind the first row 910 undetected. The second number of (undetected) photons of the x-ray radiation may then enter a portion of the semiconductor layer 1011 that is positioned behind the second row 912 of the same pixel, and a third number of photons may be converted into electrical charge. Detectors within the second row 912 of the pixel may collect the electrical charge created from the third number of photons of the x-ray radiation. The third number of photons may be less than the second number of photons, and a fourth number of photons may pass through the portion of the semiconductor layer 1011 that is positioned behind the second row 912 undetected, and so on.

Each electrical signal collected by the plurality of detectors 901 may be transmitted to the first ASIC 906 or the second ASIC 908 via signal readout traces. Further, each electrical signal may be an analog electrical signal and may be proportional to an amount of energy of a photon that was detected. The first ASIC 906 and the second ASIC 908 may convert each analog electrical signal to a digital signal by counting the occurrence of the photons. Furthermore, each ASIC may discern the energy deposited by a photon by comparing the amount of electrical signal to one or more pre-established thresholds. Specifically, the first ASIC 906 and the second ASIC 908 may include each a plurality of comparators, where each comparator of the plurality of comparators outputs a trigger signal that causes a corresponding digital counter to increment by one when the analog signal exceeds a signal level threshold associated with the comparator. Each comparator of the plurality of comparators may have a different signal level threshold. For example, the first ASIC 906 may include a first comparator with a first signal level threshold and a second comparator with a second signal level threshold, where the second signal level threshold may be higher than the first signal level threshold. Additionally, the first ASIC 906 may include a third comparator with a third signal level threshold, where the third signal level threshold may be higher than the second signal level threshold, and so on, up to a maximum energy level of a spectrum of photons. Differences between pairs of thresholds define energy ranges or bins. Thus, a number of photons whose energies fall within each bin may be recorded by an ASIC. As such, numbers of photon counts may be transmitted by the first ASIC 906 or the second ASIC 908 to the PCB 920 to be used for image reconstruction. Alternatively, each ASIC may first perform additional operations on the numerical count information, such as summing together individual photon counts from bins within a given column to produce a total number of photon counts.

Referring now to FIG. 3, a detector array 301 is shown. The detector array 301 includes a first semiconductor layer with a plurality of mesh detector elements 300 positioned on top of the first semiconductor layer to thereby form a plurality of mesh didoes. Each mesh diode includes the first semiconductor layer, a second semiconductor layer having an opposite doping polarity than the first semiconductor layer, an oxide layer, and a metal layer 318, as described herein. In some examples, as described herein, the first semiconductor layer may be an n-type semiconductor and the second semiconductor layer may be a p-type semiconductor. In other examples, the first semiconductor layer may be a p-type semiconductor and the second semiconductor layer may be an n-type semiconductor.

The plurality of mesh detector elements 300 may be non-limiting examples of the detector elements 202 of FIG. 2 or detectors of the plurality of detectors 901 of FIG. 9. Each mesh detector element of the plurality of mesh detector elements 300 may collect charge carriers (e.g., electrical signals) that are created from photons of x-ray radiation via a semiconductor. Further, in the illustrated example, the plurality of mesh detector elements 300 may include a first mesh detector element 302 and a second mesh detector element 303. The second mesh detector element 303 is similar to the first mesh detector element 302, and as such, description of the second mesh detector element 303 may be omitted for brevity and the description of the first mesh detector element 302 provided herein likewise applies to the second mesh detector element 303 and additional mesh detector elements of the detector array 301.

The first mesh detector element 302 may include the metal layer 318. The metal layer 318 may include a first end 312 and a second end 314, and may extend from the first end 312 to the second end 314 along an axis that is parallel to the y-axis. The first end 312 may be positioned closer to an edge of a detector array that is configured to receive photons of x-ray radiation, such as the edge 902 of FIG. 9. As such, the first end 312 may be oriented facing a source of x-ray radiation of a PCCT system, such as the PCCT system 100 of FIG. 1. The second end 314 may be positioned away from the source of x-ray radiation and may include a signal readout trace 316. The signal readout trace 316 may be configured to transmit electrical signals that are collected by the first mesh detector element 302 to an ASIC input of one or more components of an image processing system, such as the image reconstructor 230 of FIG. 2.

In some examples, as described herein, the first mesh detector element 302 and the second mesh detector element 303 may each be positioned on a planar surface of an n-type semiconductor layer (e.g., silicon) that is selectively doped with a p-type implant in a spatially-varying pattern (referred to as an implant layer). The planar surface may be oriented orthogonally to the edge of the detector that receives x-ray radiation. The entirety of the implant layer (e.g., the p-type silicon) may be positioned under a portion of the metal layer 318, relative to the z-axis. Further, an oxide layer may be positioned between a portion of the metal layer 318 and a portion of each of the n-type semiconductor layer and the implant layer, as described in reference to FIGS. 5 and 6. In other examples, the first mesh detector element 302 and the second mesh detector element 303 may each be positioned on a planar surface of a p-type semiconductor layer that is selectively doped with an n-type implant.

The first mesh detector element 302 may include a plurality of openings 307, including a first opening 306, thereby forming a plurality of longitudinal strips 305 in the metal layer 318, such as a first longitudinal strip 304, along the semiconductor (e.g., silicon) layer. Each opening of the plurality of openings 307 may include a gap in the metal layer 318 of the first mesh detector element 302, such that the metal layer does not extend continuously across the width (e.g., relative to the x-axis) of the first mesh detector element. Further, the implant layer may include a gap positioned under each opening, such that the implant layer does not extend continuously across the width of the first mesh detector element within the n-type semiconductor layer. For example, the implant layer and n-type semiconductor layer may each be positioned under a portion of the metal layer 318, while the n-type semiconductor layer, and not the implant layer, is positioned under the openings 307. The longitudinal strips 305 may be configured to collect charge carriers generated from photons that are collected in the semiconductor layer under the first mesh detector element 302, as described in reference to FIG. 5. The collected charge carriers may result in a photocurrent that is transferred to the signal readout trace 316 and measured by an ASIC. Each of the longitudinal strips 305 may include the metal layer 318 and may be positioned over a portion of the implant layer. Further, each of the longitudinal strips 305 may be positioned over an opening in an oxide layer, as described in reference to FIGS. 4-6. In the illustrated example, the first mesh detector element 302 includes five of the longitudinal strips 305, and each longitudinal strip may extend from the first end 312 to the second end 314 of the first mesh detector element. In some examples, the first mesh detector element 302 may include another suitable number of longitudinal strips.

In the illustrated example, the first mesh detector element 302 is shown with break lines 310, which represent a length of the first mesh detector element that is not shown in FIG. 3. The break lines 310 may allow for both the first end 312 and the second end 314 to be illustrated in FIG. 3, which may otherwise not be possible due to the length L1 of the first mesh detector element 302 relative to the length of individual features of the first mesh detector element, such as the length L2 of one of the openings 307. In some examples, the first mesh detector element 302 may have a length L1 in a range of 3 to 20 mm. Further, in some examples, each of the openings 307 may have a length L2 in a range of 0.25 to 5 mm. In other examples, the first mesh detector element 302 and the openings 307 may have other suitable lengths, where the length of the openings is less than the length of the first mesh detector element.

The openings 307 of the first mesh detector element 302 are areas that do not include the metal layer 318, and no portion of the implant layer is positioned beneath the openings. However, the oxide layer and the n-type semiconductor layer are positioned beneath the openings 307, as described in reference to FIGS. 4-5. The openings 307 may act to reduce the capacitance of the first mesh detector element 302 by reducing the area of the first mesh detector element that may collect charge carriers and/or carry photocurrent. A decrease of the capacitance of the first mesh detector element 302 may lower the electronic noise of the first mesh detector element and may therefore increase detection quality and/or sensitivity.

The openings 307 do not extend continuously from the first end 312 to the second end 314, but are instead segmented by horizontal bridges 308. Similar to the longitudinal strips 305, the horizontal bridges 308 may be configured to collect and transfer charge carriers generated from incoming photons. Each of the horizontal bridges 308 may include the metal layer 318 and may be positioned over the implant layer. Further, an opening in the oxide layer, as described in reference to FIGS. 4-6, may be positioned underneath each of the horizontal bridges 308. The horizontal bridges 308 may be oriented perpendicular to the longitudinal strips 305, and as such may have longitudinal axes that are parallel to the x-axis. Further, the horizontal bridges 308 may cross over each of the longitudinal strips 305. In this way, each of the openings 307 may be surrounded (e.g., in the x-y plane) by two of the longitudinal strips 305 and one or more of the horizontal bridges 308.

In the illustrated example, the first mesh detector element 302 includes four of the openings 307 positioned between the first end 312 and a first horizontal bridge of the horizontal bridges 308. Similarly, the first mesh detector element 302 includes four of the openings 307 positioned between a last horizontal bridge of the horizontal bridges 308 and the second end 314 of the first mesh detector element, and between each set of consecutive horizontal bridges of the horizontal bridges 308. In some examples, the first mesh detector element 302 may include a different number of the openings 307 positioned between the first end 312 and a horizontal bridge, the second end 314 and a horizontal bridge, and/or consecutive horizontal bridges of the horizontal bridges 308. Each of the openings 307 may have a width W3 in a range of 20-50 µm, such as 35 µm, as shown in FIG. 4. In some examples, the openings 307 may have another suitable width.

The longitudinal strips 305 may be oriented with their longitudinal axes parallel to the y-axis (e.g., parallel to the direction of incoming x-ray photons). Further, each of the longitudinal strips 305 may have a width W1 in a range of 10 to 50 µm, such as 25 µm, as illustrated in FIG. 4. In some examples, the longitudinal strips 305 may have another suitable width. The number and width W1 of the longitudinal strips 305 may be determined based on a width W2 of the first mesh detector element 302 along the x-axis, where the width W2 is in a range of 150 to 1000 µm, such as 500 µm. It may be desirable for a collective area of the openings 307 (e.g., added together the area of each opening) to be equal to a certain percentage (e.g., ratio) of an area of the first mesh detector element 302. The ratio between the collective area of the openings 307 and the area of the first mesh detector element 302 is at least 10% and no more than 75&, such as, in some examples, a percentage in a range of 55-65%.

A ratio in the range of 55-65% between the collective area of the openings 307 and the area of the first mesh detector element 302 may provide an ideal balance between reducing the capacitance (e.g., electronic noise) of the first mesh detector element and maintaining a sufficient detection efficiency (e.g., charge collection area). For example, a lower ratio between the collective opening area and the area of the first mesh detector element 302 (e.g., such as 10%) may increase the detection efficiency of the first mesh detector by increasing an area for charge collection, but the amount of capacitance reduction (e.g., electronic noise reduction) of the first mesh detector may be reduced. Alternatively, a higher ratio between the collective opening area and the area of the first mesh detector (e.g., such as 75%) may reduce the capacitance (e.g., electronic noise) of the first mesh detector element by a greater amount, but may not allow for a sufficient detection efficiency due to a reduced area for charge collection. Further, the ratio between the collective opening area and the area of the first mesh detector is specifically selected to maintain detection efficiency for an edge-on detector array, where x-ray photons do not impinge directly on the first mesh detector element.

FIG. 4 shows a portion of the first mesh detector element 302, including the first end 312, the longitudinal strips 305, and the openings 307. The first mesh detector element 302 may have the width W2 and each of the longitudinal strips 305 may have the width W1, where the width W2 and the width W1 correspond to the width of the metal layer 318 across the entire first mesh detector element and a longitudinal strip, respectively. Further, each of the openings 307 may have the width W3, as described in reference to FIG. 3.

The first mesh detector element 302 may be positioned on a semiconductor layer, as described in reference to FIG. 5, which may be configured to receive photons of x-ray radiation. Further, the metal layer 318 of the first mesh detector element 302 may be positioned over an implant layer 404. The implant layer 404 may be a p-type extrinsic semiconductor (e.g., a doped intrinsic semiconductor). As such, the implant layer 404 may have been doped with an electron acceptor element and may have a larger hole concentration than electron concentration (e.g., electrons are the minority carriers). In some examples, the implant layer 404 may include regions of the semiconductor layer that are doped with boron or gallium. The implant layer 404 may be in junction with an n-type semiconductor, such as the semiconductor layer 502 of FIG. 5. Further, an oxide layer 506 (shown in FIG. 6) may be positioned above the implant layer 404 and the semiconductor layer and below the metal layer 318, relative to the z-axis. The oxide layer may include an oxide opening 406 that extends along the metal layer 318 and implant layer 404. The metal layer 318 may be configured to collect electrical charge that is generated in the n-type semiconductor layer and passed through the implant layer 404 of the first mesh detector element 302. As such, the metal layer 318 may include aluminum, an alloy of aluminum and silicon, an alloy of aluminum and copper, copper, tungsten, titanium, or any other metals compatible with the device manufacturing production line. The metal may also be comprised of several layers, such as an initial adhesion layer (such as titanium), a diffusion-blocking layer (such as nickel) and a thicker layer of the primary conductor material (such as aluminum).

As illustrated in FIG. 4, a first end area 412 extends from the first end 312 of the metal layer 318 to a beginning of the openings 307. The first end area 412 may be a region of the first mesh detector element 302 that does not include any openings and thus includes the metal layer 318, the implant layer 404, portions of the oxide layer, and the oxide opening 406. The first end area 412 may have a length L3 (defined by the length of the metal layer 318) in a range of 20 to 100 µm, such as 40 µm. Further, the first end area 412 may include rounded external corners 408. The rounded external corners 408 may help to prevent voltage breakdown within the first mesh detector element 302. The rounded external corners 408 may increase the dielectric strength of the first mesh detector element 302, compared to if the first mesh detector element 302 have non-rounded external corners, and may therefore increase the voltage required to cause electrical breakdown across the first mesh detector element. The rounded external corners 408 may have a radius of curvature in a range of 20-80 µm, such as 45 µm.

The longitudinal strips 305 may have longitudinal axes that are parallel to the y-axis. The longitudinal strips 305 may include the metal layer 318, and may be positioned over the implant layer 404 and the oxide opening 406. The metal layer 318 of each of the longitudinal strips 305 may have the same width W1 as the longitudinal strips (e.g., 35 µm). The implant layer 404 positioned under each of the longitudinal strips 305 may have a width W4 that is smaller than the width W3 by an amount in the range of 5 to 25 µm, such as 16 µm. The oxide opening 406 positioned under each of the longitudinal strips 305 may have a width W5 that is smaller than the width W4 by an amount in a range of 2-20 µm, such as 6 µm. In some examples, the metal layer 318 of the longitudinal strips 305, and the implant layer 404 and the oxide opening 406 positioned under each of the longitudinal strips, may have different suitable widths.

The openings 307 may have longitudinal axes that are parallel to the y-axis, and therefore are parallel to the longitudinal strips 305. Further, the openings 307 may not include the metal layer 318 and may not have the implant layer 404 or the oxide opening 406 positioned underneath. Instead, the openings 307 may be positioned over the oxide layer and the n-type semiconductor layer, as described in reference to FIG. 5.

Each of the openings 307 may include curved internal corners 410, where each curved internal corner extends along an inner edge of the metal layer 318. For example, the metal layer 318 may have an inner edge 413 that forms a first curved internal corner 411. The inner edge 413 extends linearly along the y-axis until a first transition region 414, where the inner edge curves upward (e.g., towards the first end 312) to a point 416 and then downward until a second transition region 418, where the inner edge again extends linearly along the y-axis. In some examples, the curved internal corners 410 may have a radius of curvature in a range of 5-100 µm, such as 25 µm. In other examples, the curved internal corners 410 may have a different suitable radius of curvature. Further, the implant layer 404 and the oxide opening 406 are each curved at the curved internal corners 410, but with different suitable radiuses of curvature. The curved internal corners 410 may help to prevent voltage breakdown within the first mesh detector element 302. The curved internal corners 410 may increase the dielectric strength of the first mesh detector element 302, compared to if the first mesh detector element 302 have non-curved internal corners, and may therefore increase the voltage required to cause electrical breakdown across the first mesh detector element.

FIG. 5 shows a cross sectional view of the first mesh detector element 302 including a semiconductor layer 502 taken along the cut line A1 shown in FIG. 4. As shown in FIG. 5, the first mesh detector element 302 includes the metal layer 318 positioned on the semiconductor layer 502, with the implant layer 404 accommodated within the semiconductor layer 502 and an oxide layer 506 positioned on the semiconductor layer 502 and under the metal layer 318. A common backside electrode 504 may be deposited on a bottom surface of the semiconductor layer 502, relative to the z-axis. In some examples, the common backside electrode 504 may have a thickness along the z-axis of approximately 1 µm. It is to be appreciated that the semiconductor layer 502, the oxide layer 506, and the common backside electrode 504 may each extend beyond the first mesh detector element 302 and form the semiconductor layer, the oxide layer, and common electrode for each mesh detector element of the detector array. Further, a separating area 510 may surround the first mesh detector element 302 such that the separating area is positioned between the first mesh detector element and any other mesh detector element. Similarly, the separating area 510 may extend between each mesh detector element and its neighboring mesh detector elements, such that the mesh detector elements are separated by the separating area. The separating area 510 may include the semiconductor layer 502, the oxide layer 506, and the common backside electrode 504.

The semiconductor layer 502 may have a height H1 in a range of 200-1000 µm, such as 500 µm, where the height H1 extends from a bottom surface of the semiconductor layer to a top surface of the semiconductor layer along the z-axis. In some examples, the first mesh detector element 302 may have a different height.

The semiconductor layer may be silicon, in some examples. Further, the semiconductor layer 502 may be an n-type extrinsic semiconductor (e.g., a doped intrinsic semiconductor). As such, the semiconductor layer 502 may have been doped with an electron donor element and may have a larger electron concentration than hole concentration (e.g., electrons are the majority carriers). In some examples, the semiconductor layer 502 may include silicon doped with phosphorus, arsenic, antimony, or bismuth. The semiconductor layer 502 may be in junction with a p-type semiconductor, such as the implant layer 404. As illustrated, the semiconductor layer 502 may be positioned beneath (e.g., relative to the z-axis) and next to (e.g., relative to the x-axis) the implant layer 404. Further, the implant layer 404 may be positioned beneath a portion of the metal layer 318 of each of the longitudinal strips 305 of the first mesh detector element 302.

The semiconductor layer 502 may be configured to receive photons of x-ray radiation at a first end (e.g., the edge 902 of FIG. 9). The x-ray photons may be absorbed into the semiconductor layer 502 and converted into charge carriers that are capable of transferring an electrical signal. The charge carriers may travel through the semiconductor layer 502, at least partially along the z-axis, through the implant layer 404 and to the metal layer 318 of the longitudinal strips 305, where the charge carriers may travel to a second end (e.g., the second end 314 of FIG. 3) of the first mesh detector element 302. Further, the charge carriers may be transferred as an electrical signal from the first mesh detector element 302 to an ASIC via a signal readout trace such as the signal readout trace 316 of FIG. 3.

The common backside electrode 504 may be positioned below the semiconductor layer 502, relative to the z-axis. An electrical bias potential (e.g., a voltage) may be applied to the common backside electrode 504 relative to the potential of the mesh detectors to create an electric field across the semiconductor layer. As such, the common backside electrode 504 may influence charge carriers of one charge polarity that are generated within the semiconductor layer 502 to travel toward the metal layer 318 of the first mesh detector element 302 (e.g., away from the common backside electrode 504, relative to the z-axis), while charge carriers of the opposite polarity move towards the common backside electrode 504.

The metal layer 318 may be positioned above the semiconductor layer 502, relative to the z-axis. Similarly, a portion of the metal layer 318 may be positioned above the implant layer 404. The oxide opening 406 may be positioned intermediate the metal layer 318 and the implant layer 404, relative to the z-axis. A portion of the metal layer 318 may be in face sharing contact with a portion of the implant layer 404 through the oxide opening 406. As such, charge carriers that are generated in the semiconductor layer 502 may travel to the metal layer 318 via the implant layer 404 and through the oxide opening 406. Other than at the position of the oxide opening 406, an oxide layer 506 may separate the metal layer 318 and the implant layer 404. Further, the oxide layer 506 is positioned intermediate a portion of the metal layer 318 and a portion of the semiconductor layer 502 such that no part of the metal layer is in face sharing contact with the semiconductor layer. The oxide layer 506 is further described in reference to FIG. 6.

The openings 307 of the first mesh detector element 302 may be positioned between the longitudinal strips 305, relative to the x-axis. The openings 307 may not include the metal layer 318, and as such, the oxide layer 506 may be the top-most layer of the diode openings, relative to the z-axis. In this way, the openings 307 act to reduce the capacitance of the first mesh detector element 302 by reducing the area of the metal layer 318.

FIG. 6 shows a zoomed in view of an area 508 of the cross-sectional view shown in FIG. 5, including one of the longitudinal strips 305 and a portion of two of the openings 307 of the first mesh detector element 302. The semiconductor layer 502, the metal layer 318, the implant layer 404, the oxide layer 506, and the oxide opening 406 are each illustrated.

The oxide layer 506 may be relatively thin when compared to the semiconductor layer 502, and may have a height in a range of 0.2-10 μm. The oxide layer 506 may be positioned above the semiconductor layer 502, relative to the z-axis, and a portion of the oxide layer may be in face sharing contact with the semiconductor layer. The oxide layer 506 and the semiconductor layer 502 may be in face sharing contact, except at the positions of the implant layer 404. At the positions of the implant layer 404, a portion of the oxide layer 506 may be in face sharing contact with the implant layer, and the implant layer may be embedded within the semiconductor layer 502. Further, the oxide layer 506 may have terminating edges positioned such that the oxide opening 406 is positioned over the center (e.g., relative to the x-axis) of the implant layer 404. The oxide opening 406 may allow a portion of the metal layer 318 to be in face sharing contact with the implant layer 404.

The metal layer 318 terminates at a first edge 602 and a second edge 604, and as such, the openings 307 may begin at the first edge and second edge and extend outwards from the metal layer, relative to the x-axis. The first edge 602 and the second edge 604 may be positioned above the semiconductor layer 502 and the oxide layer 506, with the oxide layer positioned above the semiconductor layer, relative to the z-axis. As such, the oxide layer 506 may be exposed to the surrounding environment through the openings 307. Further, a portion of the oxide layer 506 and a portion of the semiconductor layer 502 are in face sharing contact.

The first mesh detector element 302 may be a non-limiting example of the first detector 1014 of FIG. 10. As such, the detector array 900 of FIG. 9 may include a plurality of mesh detector elements similar to the first mesh detector element 302. Further, when arranged in a detector array (e.g., the detector array 900) the plurality of mesh detector elements (e.g., the first mesh detector element 302) may be formed on a planar side of a semiconductor layer and organized into rows and/or columns. The mesh detector elements may be spaced apart in such a way that reduces an amount of dead/inactive areas of the detector array while reducing manufacturing complexity.

FIG. 7 shows a portion of an example detector array 700. The portion of the detector array 700 illustrated includes a corner 701 of the detector array. In some examples, the corner 701 may be rounded. In other examples, the corner 701 may not be rounded, and instead comprise a meeting of two straight edges at an angle such as 90 degrees. The detector array 700 may include a plurality of detector elements such as a first mesh detector element 706, a second mesh detector element 708, and a third mesh detector element 710. Further, the detector array 700 may include a semiconductor area 714, an outside edge 702, and a guard ring 704. The detector array 700 may include a backside common electrode (not shown), such as the common backside electrode 504 of FIG. 5.

The semiconductor area 714 may include portions of the detector array 700 where mesh detector elements (e.g., the first mesh detector element 706) are not positioned. As such, the semiconductor area 714 may include a semiconductor layer and an oxide layer, where the oxide layer is positioned above (e.g., relative to the z-axis) and in face sharing contact with the semiconductor layer. As such, the semiconductor area 714 may be similar to the separating area 510 of FIG. 5.

The outside edge 702 may act as an outer edge of the detector array 700. As such, the outside edge 702 may extend entirely around the detector array 700, with no component of the detector array extending past the outside edge. The outside edge 702 may include one or more straight edges and one or more corners, such as a straight edge 703 and the corner 701. In some examples, the straight edge 703 may not be aligned with the y-axis, and as such, may not be parallel with edges of the first mesh detector element 706 or the second mesh detector element 708. For example, a bottom of the straight edge 703, relative to the y-axis, may be further along the x-axis than a top of the straight edge (e.g., a bottom of the straight edge 703 may be angled inwards). In this way, the detector array 700 may fit into a chiclet and/or module of a PCCT detector that includes sides that are not orthogonal. In other examples, the straight edge 703 may be aligned with the x-axis and/or may be orthogonal to neighboring straight edges of the outside edge 702. The guard ring 704 may be positioned between the outside edge 702 and the mesh detector elements, such as the third mesh detector element 710, such that the mesh detector elements are separated from the outside edge. Further, the guard ring 704 may define an outer boundary of the semiconductor area 714 wherein x-ray generated charge carriers can be measured (e.g., an active area of the semiconductor). Charge carriers generated between the guard ring 704 and the outside edge 702 are collected on the guard ring 704. Such collected charge may be measured by the system electronics, but does not form part of the imaging data.

The first mesh detector element 706 may include longitudinal strips, openings, and horizontal bridges, which may be similar to the longitudinal strips 305, the openings 307, and the horizontal bridges 308, of FIG. 3, respectively. The second mesh detector element 708 may include longitudinal strips and openings, which may be similar to the longitudinal strips 305 and the openings 307, respectively. The second mesh detector element 708 may not include any horizontal bridges. In some examples, the second mesh detector element 708 may be short enough that horizontal bridges are not demanded to collect and/or transfer charge carriers, and therefore the horizontal bridges may be omitted from the second mesh detector element. For example, the first mesh detector element 706 may be longer than the second mesh detector element 708, and therefore the first mesh detector element may include horizontal bridges to increase the size of a metal layer of the first mesh detector element while the second mesh detector element may not include horizontal bridges. Further, the longitudinal strips and openings of the second mesh detector element 708 may have a greater length than the longitudinal strips and openings of the first mesh detector element 706.

The third mesh detector element 710 may include longitudinal strips, openings, and one horizontal bridge, which may be similar to the longitudinal strips 305, the openings 307, and the horizontal bridges 308, of FIG. 3, respectively. Further, the third mesh detector element 710 may include a charge carrying area 716. The charge carrying area 716 may be similar in composition to the longitudinal strips (e.g., may include a metal layer positioned above an implant layer and an oxide opening) and as such may act to collect and transfer charge carriers. The third mesh detector element 710 may include the charge carrying area 716 due to proximity of the third mesh detector element to the guard ring 704 and the inward slant of the straight edge 703 relative to the x-axis. In order for the third mesh detector element 710 to be positioned proximate the guard ring 704, a first edge 720 of the third mesh detector element may be slanted relative to the y-axis. Further, the first edge 720 may be slanted relative to a second edge 722 of the third mesh detector element 710, which may cause the surface area of third mesh detector element to decrease further down the x-axis. As such, the slant of the first edge 720 may cause the charge carrying area 716 to not have a sufficient shape and/or surface area to position one or more openings within the charge carrying area 716.

The second mesh detector element 708 and the third mesh detector element 710 may include signal readout traces 712. The signal readout traces 712 may be positioned at an end of the mesh detector elements that is opposite the direction of incoming x-ray photons. For example, an end 724 of the detector array 700 may be configured to receive x-ray radiation (e.g., x-ray photons) within the semiconductor layer. Further, the signal readout traces 712 may be configured to transmit electrical signals from the second mesh detector element 708 and the third mesh detector element 710 to an image processing unit. Although not illustrated in FIG. 7, the first mesh detector element 706 may also include a signal readout trace.

It should be appreciated that the detector array 700 may include more than three mesh detector elements positioned within the semiconductor area 714 of the detector array. Mesh detector elements that are positioned near the middle of the detector array 700 may be similar to the first mesh detector element 706. Mesh detector elements that are positioned near additional corners of the detector array 700 may be similar to the third mesh detector element 710. Further, mesh detector elements that are positioned near the guard ring 704 may include one or more slanted edges, which may cause one or more portions of the mesh detector elements to lack sufficient area for including an opening. In portions of a mesh detector element where insufficient area is available, openings may be omitted, and as such, one or more rows of openings may include more or less openings than other rows. The mesh detector elements may be organized into rows and/or columns in order to maximize the surface area of the semiconductor layer that is covered by mesh detector elements. In this way, the number of dead/inactive areas of the detector array 700 may be reduced by the orientation and organization of mesh detector elements within the detector array.

FIG. 8 shows a portion of a second example of a detector array 800. The detector array 800 may include an outside edge 802 and a guard ring 804, similar in function to the outside edge 702 and the guard ring 704 of FIG. 7, respectively. The guard ring 804 may be positioned between the outside edge 802 and mesh detector elements of the detector array 800. As such, the guard ring 804 may collect leakage current originating at the outside edge 802, preventing it from overly influencing the detector array 800.

The detector array 800 may include a mesh detector element 806. The mesh detector element 806 may be triangular, and may include rounded exterior corners such as the corner 808. The rounded exterior corners may reduce the chance of voltage breakdown across the mesh detector element 806. Further, the triangular shape of the mesh detector element 806 may allow the mesh detector element to be positioned proximate the guard ring 804. Further, in some examples, the mesh detector element 806 may include exterior corners that are not rounded (e.g., two straight lines meeting at an angle).

The detector array 800 may be configured to receive x-rays at a first end 810 and to transmit an electrical signal from a second end 812. In some examples, the mesh detector element 806 may transmit electrical signals via a signal readout trace, such as the signal readout trace 316 of FIG. 3.

The mesh detector element 806 may include longitudinal strips, openings, and horizontal bridges, which may be similar to the longitudinal strips 305, the openings 307, and horizontal bridges 308, of FIG. 3, respectively. The longitudinal strips, the openings, and the horizontal bridges of the mesh detector element 806 may have different suitable dimensions than previously described mesh detector elements (e.g., the first mesh detector element 302 of FIG. 3 or the first mesh detector element 706 of FIG. 7). For example, each horizontal bridge of the mesh detector element 806 may have a shorter length that the horizontal bridges of the first mesh detector element 706 of FIG. 7 and/or the ratio of overall area of the openings to the area of the mesh detector element may be larger than for the first mesh detector element 302 of FIG. 3.

The mesh detector element 806 may include areas without openings, such as the charge carrying area 814, which may be similar in function to the charge carrying area 716 of FIG. 7. As such, the charge carrying area 814 may be similar in composition to the longitudinal strips (e.g., may include a metal layer positioned over an implant layer and an oxide opening) and as such may act to collect and/or transfer charge carriers. The charge carrying area 814 may be a result of the triangular shape of the mesh detector element 806 and the proximity of the mesh detector element to the guard ring 804. A first edge 816 of the mesh detector element 806 may be slanted relative to a second edge 818 of the mesh detector element. The slant of the first edge 816 may cause the mesh detector element 806 to not have sufficient surface area for one or more openings along the first edge. As such, the charge carrying area 814 may not be a sufficient shape and/or have sufficient surface area to position one or more additional openings. Similar to the third mesh detector element 710 of FIG. 7, the mesh detector element 806 may include more openings in some rows than in other rows due to the slant of the first edge 816.

It should be appreciated that the detector array 800 may include more than one mesh detector element positioned within the guard ring 804 of the detector array. Mesh detector elements positioned near the guard ring 804 may include one or more slanted edges, and therefore may not include a constant number of diode openings and/or longitudinal strips along the length of the mesh detector elements. Mesh detector elements that are positioned near the middle of the detector array 800 may not include slanted edges, and may therefore be similar to the first mesh detector element 302 of FIG. 3. The mesh detector elements may be organized into rows and/or columns in order to maximize the surface area of the semiconductor layer that is covered by mesh didoes. In this way, the number of dead/inactive areas of the detector array 800 may be reduced by the orientation and organization of mesh detector elements within the detector array.

The technical effect of a PCCT detector including mesh detector elements comprised of longitudinal strips, openings, and horizontal bridges is that images may be reconstructed with a greater resolution and with less noise. By including openings in the mesh detector elements, the capacitance of the mesh detector elements is decreased and the electronic noise of the PCCT detector is reduced. As such, the contrast-to-noise ratio (CNR) for soft tissue contrast imaging may be increased and the CNR for material decomposition imaging may be maintained or increased.

The disclosure also provides support for a detector for medical imaging, comprising: a mesh detector element formed on a planar side of a first semiconductor layer, the mesh detector element comprising a metal layer including a plurality of longitudinal strips, each longitudinal strip positioned over a respective second semiconductor layer of an opposite doping polarity from the first semiconductor layer, and embedded in the first semiconductor layer and separated from a neighboring longitudinal strip by a respective opening of a plurality of openings, such that the metal layer does not extend continuously across a width of the mesh detector element. In a first example of the detector, the detector further comprises: an oxide layer on the planar side of the first semiconductor layer, wherein the oxide layer comprises a plurality of oxide openings, each oxide opening aligned with a respective longitudinal strip. In a second example of the detector, optionally including the first example, each longitudinal strip is in face-sharing contact with the respective second semiconductor layer via a respective oxide opening. In a third example of the detector, optionally including one or both of the first and second examples, the mesh detector element has an overall area defined by the width of the metal layer and a length of the metal layer, wherein each opening of the plurality of openings has an opening area, and wherein a collective opening area defined by adding each opening area comprises at least 10% of the overall area. In a fourth example of the detector, optionally including one or more or each of the first through third examples, the plurality of longitudinal strips comprises a first longitudinal strip and a second longitudinal strip, wherein the plurality of openings comprises a first opening separating the first longitudinal strip from the second longitudinal strip, wherein the first longitudinal strip has a first inner edge that extends in parallel to a second inner edge of the second longitudinal strip, and wherein the first inner edge is connected to the second inner edge via a curved edge of the metal layer. In a fifth example of the detector, optionally including one or more or each of the first through fourth examples, the plurality of longitudinal strips comprises five longitudinal strips and wherein the plurality of openings comprises four openings. In a sixth example of the detector, optionally including one or more or each of the first through fifth examples, the plurality of openings comprises a first row of openings and a second row of openings separated by a horizontal bridge, and wherein each longitudinal strip of the plurality of longitudinal strips extends continuously from a first end area of the mesh detector element to a second end area of the mesh detector element along a length of the metal layer. In a seventh example of the detector, optionally including one or more or each of the first through sixth examples, the mesh detector element comprises a signal readout trace at the second end area. In an eighth example of the detector, optionally including one or more or each of the first through seventh examples, the mesh detector element is a first mesh detector element of a plurality of mesh detector elements formed on the planar side of the first semiconductor layer. In a ninth example of the detector, optionally including one or more or each of the first through eighth examples, the planar side of the first semiconductor layer is a first planar side of the first semiconductor layer, and further comprising a common backside electrode positioned on a second planar side of the first semiconductor layer. In a tenth example of the detector, optionally including one or more or each of the first through ninth examples, the first semiconductor layer, the common backside electrode, and the plurality of mesh detector elements form a first sensor, and wherein the detector comprises the first sensor and a plurality of additional sensors arranged such that an edge of the first semiconductor layer of the first sensor that is orthogonal to the first planar side and the second planar side is configured to receive photons of x-ray radiation. In a eleventh example of the detector, optionally including one or more or each of the first through tenth examples, the first semiconductor layer is an n-type semiconductor and the second semiconductor layer is a p-type semiconductor.

The disclosure also provides support for a detector for medical imaging, comprising: an n-type semiconductor layer, an oxide layer positioned on a first planar side of the n-type semiconductor layer, a common backside electrode positioned on a second planar side of the n-type semiconductor layer, and a plurality of mesh detector elements formed on the first planar side of the n-type semiconductor layer, each mesh detector element comprising a metal layer including a plurality of longitudinal strips, each longitudinal strip positioned over a respective p-type semiconductor layer embedded in the n-type semiconductor layer and separated from a neighboring longitudinal strip by a respective opening of a plurality of openings of that mesh detector element. In a first example of the detector, each longitudinal strip is in face-sharing contact with the respective p-type semiconductor layer via a respective oxide opening. In a second example of the detector, optionally including the first example, each mesh detector element has an overall area defined by a width of the metal layer and a length of the metal layer, wherein each opening of the plurality of openings has an opening area, and wherein a collective opening area defined by adding each opening area comprises 10% of the overall area. In a third example of the detector, optionally including one or both of the first and second examples, the plurality of longitudinal strips comprises a first longitudinal strip and a second longitudinal strip, and wherein the plurality of openings comprises a first opening separating the first longitudinal strip from the second longitudinal strip. In a fourth example of the detector, optionally including one or more or each of the first through third examples, the plurality of longitudinal strips comprises five longitudinal strips and wherein the plurality of openings comprises four openings. In a fifth example of the detector, optionally including one or more or each of the first through fourth examples, the plurality of openings comprises a first row of openings and a second row of openings separated by a horizontal bridge, and wherein each longitudinal strip of the plurality of longitudinal strips extends continuously along a length of the metal layer.

The disclosure also provides support for a detector for medical imaging, comprising: an n-type semiconductor layer having a perimeter defined by a top edge, a first side edge, a second side edge, and a bottom edge, the top edge configured to receive photons of x-ray radiation, the first side edge meeting the top edge at a first corner of the n-type semiconductor layer, and a plurality of mesh detector elements formed on a first planar side of the n-type semiconductor layer, the plurality of mesh detector elements including: a first mesh detector element positioned at the first corner, the first mesh detector element comprising a first metal layer including a first plurality of longitudinal strips, each first longitudinal strip separated from a neighboring first longitudinal strip by a respective first opening of a plurality of first openings of the first mesh detector element, and a second mesh detector element positioned closer to the second side edge than the first mesh detector element, the second mesh detector element comprising a second metal layer including a second plurality of longitudinal strips, each second longitudinal strip separated from a neighboring second longitudinal strip by a respective second opening of a plurality of second openings of the second mesh detector element, wherein the plurality of first openings includes a different number of openings than the plurality of second openings. In a first example of the detector, the plurality of first openings comprises a first row of openings and a second row of openings separated by a first horizontal bridge, and wherein the plurality of second openings comprises a third row of openings and a fourth row of openings separated by a second horizontal bridge.

In another representation, an edge-on detector array for a diagnostic imaging system is provided that includes an n-type semiconductor layer and a plurality of mesh detector elements positioned on a planar side of the n-type semiconductor layer. Each mesh detector element includes a plurality of detector strips extending along a length of the mesh detector element. Further, each detector strip includes a metal layer at least partially positioned over a p-type semiconductor layer and separated from a neighboring detector strip by an opening. As such, the p-type semiconductor layer and the metal layer do not extend continuously along a width of the mesh detector element.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A detector for medical imaging, comprising:
a mesh detector element formed on a planar side of a first semiconductor layer, the mesh detector element comprising a metal layer including a plurality of longitudinal strips, each longitudinal strip positioned over a respective second semiconductor layer of an opposite doping polarity from the first semiconductor layer, and embedded in the first semiconductor layer and separated from a neighboring longitudinal strip by a respective opening of a plurality of openings, such that the metal layer does not extend continuously across a width of the mesh detector element, wherein the plurality of longitudinal strips comprises a first longitudinal strip and a second longitudinal strip, wherein the plurality of openings comprises a first opening separating the first longitudinal strip from the second longitudinal strip, wherein the first longitudinal strip has a first inner edge that extends in parallel to a second inner edge of the second longitudinal strip, and wherein the first inner edge is connected to the second inner edge via a curved edge of the metal layer.

2. The detector of claim 1, further comprising an oxide layer on the planar side of the first semiconductor layer, wherein the oxide layer comprises a plurality of oxide openings, each oxide opening aligned with a respective longitudinal strip.

3. The detector of claim 2, wherein each longitudinal strip is in face-sharing contact with the respective second semiconductor layer via a respective oxide opening.

4. The detector of claim 1, wherein the mesh detector element has an overall area defined by the width of the metal layer and a length of the metal layer, wherein each opening of the plurality of openings has an opening area, and wherein a collective opening area defined by adding each opening area comprises at least 10% of the overall area.

5. The detector of claim 1, wherein the plurality of longitudinal strips comprises five longitudinal strips and wherein the plurality of openings comprises four openings.

6. The detector of claim 1, wherein the plurality of openings comprises a first row of openings and a second row of openings separated by a horizontal bridge, and wherein each longitudinal strip of the plurality of longitudinal strips extends continuously from a first end area of the mesh detector element to a second end area of the mesh detector element along a length of the metal layer.

7. The detector of claim 6, wherein the mesh detector element comprises a signal readout trace at the second end area.

8. The detector of claim 1, wherein the mesh detector element is a first mesh detector element of a plurality of mesh detector elements formed on the planar side of the first semiconductor layer.

9. The detector of claim 8, wherein the planar side of the first semiconductor layer is a first planar side of the first semiconductor layer, and further comprising a common backside electrode positioned on a second planar side of the first semiconductor layer.

10. The detector of claim 9, wherein the first semiconductor layer, the common backside electrode, and the plurality of mesh detector elements form a first sensor, and wherein the detector comprises the first sensor and a plurality of additional sensors arranged such that an edge of the first semiconductor layer of the first sensor that is orthogonal to the first planar side and the second planar side is configured to receive photons of x-ray radiation.

11. The detector of claim 1, wherein the first semiconductor layer is an n-type semiconductor and the second semiconductor layer is a p-type semiconductor.

12. A detector for medical imaging, comprising:
an n-type semiconductor layer;
an oxide layer positioned on a first planar side of the n-type semiconductor layer;
a common backside electrode positioned on a second planar side of the n-type semiconductor layer; and
a plurality of mesh detector elements formed on the first planar side of the n-type semiconductor layer, each mesh detector element comprising a metal layer including a plurality of longitudinal strips, each longitudinal strip positioned over a respective p-type semiconductor layer embedded in the n-type semiconductor layer and separated from a neighboring longitudinal strip by a respective opening of a plurality of openings of that mesh detector element, wherein the plurality of openings comprises a first row of openings and a second row of openings separated by a horizontal bridge, and wherein each longitudinal strip of the plurality of longitudinal strips extends continuously along a length of the metal layer.

13. The detector of claim 12, wherein each longitudinal strip is in face-sharing contact with the respective p-type semiconductor layer via a respective oxide opening.

14. The detector of claim 12, wherein each mesh detector element has an overall area defined by a width of the metal layer and the length of the metal layer, wherein each opening of the plurality of openings has an opening area, and wherein a collective opening area defined by adding each opening area comprises 10% of the overall area.

15. The detector of claim 12, wherein the plurality of longitudinal strips comprises a first longitudinal strip and a second longitudinal strip, and wherein the plurality of openings comprises a first opening separating the first longitudinal strip from the second longitudinal strip.

16. The detector of claim 12, wherein the plurality of longitudinal strips comprises five longitudinal strips and wherein the plurality of openings comprises four openings.

17. A detector for medical imaging, comprising:
an n-type semiconductor layer having a perimeter defined by a top edge, a first side edge, a second side edge, and a bottom edge, the top edge configured to receive photons of x-ray radiation, the first side edge meeting the top edge at a first corner of the n-type semiconductor layer; and
a plurality of mesh detector elements formed on a first planar side of the n-type semiconductor layer, the plurality of mesh detector elements including:
a first mesh detector element positioned at the first corner, the first mesh detector element comprising a first metal layer including a first plurality of longitudinal strips, each first longitudinal strip separated from a neighboring first longitudinal strip by a respective first opening of a plurality of first openings of the first mesh detector element; and
a second mesh detector element positioned closer to the second side edge than the first mesh detector element, the second mesh detector element comprising a second metal layer including a second plurality of longitudinal strips, each second longitudinal strip separated from a neighboring second longitudinal strip by a respective second opening of a plurality of second openings of the second mesh detector element, wherein the plurality of first openings includes a different number of openings than the plurality of second openings.

18. The detector of claim 17, wherein the plurality of first openings comprises a first row of openings and a second row of openings separated by a first horizontal bridge, and wherein the plurality of second openings comprises a third row of openings and a fourth row of openings separated by a second horizontal bridge.

* * * * *